US00RE39973E

(19) United States
(12) Reissued Patent
Spence et al.

(10) Patent Number: US RE39,973 E
(45) Date of Reissued Patent: Jan. 1, 2008

(54) METALLIC SEAL

(75) Inventors: John Loyd Spence, Severna Park, MD (US); Kevin R. Felber, Clarksville, MD (US)

(73) Assignee: PerkinElmer, Inc., Wellesley, MA (US)

(21) Appl. No.: 10/876,288

(22) Filed: Jun. 25, 2004

Related U.S. Patent Documents

Reissue of:
(64) Patent No.: 6,409,180
Issued: Jun. 25, 2002
Appl. No.: 09/556,815
Filed: Apr. 21, 2000

(51) Int. Cl.
*F16J 15/02* (2006.01)

(52) U.S. Cl. ..... 277/608; 277/644; 277/647; 277/910; 277/626

(58) Field of Classification Search ..... 277/608, 277/626, 647, 644, 910
See application file for complete search history.

(56) References Cited

U.S. PATENT DOCUMENTS

| | | | | | |
|---|---|---|---|---|---|
| 3,012,802 | A | * | 12/1961 | Waite | 277/612 |
| 3,033,582 | A | * | 5/1962 | Creavey | 277/612 |
| 3,275,335 | A | * | 9/1966 | Johnson et al. | 277/612 |
| 4,477,087 | A | * | 10/1984 | Sutter, Jr. et al. | |
| 4,807,514 | A | * | 2/1989 | Gartzmuller | 277/626 |
| 6,042,121 | A | * | 3/2000 | Ma et al. | 277/608 |
| 6,241,254 | B1 | * | 6/2001 | Gromyko et al. | 277/626 |
| 6,409,180 | B1 | * | 6/2002 | Spence et al. | 277/608 |

FOREIGN PATENT DOCUMENTS

| | | | |
|---|---|---|---|
| EP | 0930452 A1 | * | 7/1999 |
| GB | 849803 | * | 9/1960 |
| GB | 926789 | * | 5/1963 |
| GB | 1368773 | * | 10/1974 |
| GB | 1533404 | * | 11/1978 |
| GB | 2327474 A | * | 1/1999 |

* cited by examiner

*Primary Examiner*—Michael Safavi
(74) *Attorney, Agent, or Firm*—Global IP Counselors, LLP

(57) ABSTRACT

A metallic seal is provided that concentrates the available load over a narrow band to produce a sealing dam over a sufficient width to minimize leakage on a molecular level. The metallic seal has a first annular beam section, a second annular beam section, and inner and outer surfaces extending between the first and second annular beam sections. One of the inner and outer surfaces has an annular recess that at least partially defines an annular column section of material extending substantially perpendicular between said first and second annular beam sections thereto. The first annular beam section has a first non-sealing surface and a first raised portion with a first annular sealing surface facing in a first axial direction to contact a first member for creating a first annular sealing dam therebetween. The second annular beam section has a second non-sealing surface and a first raised portion with a second annular sealing surface facing in a second axial direction, which is opposite to the first axial direction, to contact a second member for creating a second annular sealing dam therebetween. The annular inner surface extends between the first and second sealing surfaces to form a central passageway. The metallic seal is used to create a seal between a pair of mating surfaces of a first member and a second member. First and second members are coupled together by a plurality of fasteners or bolts. By tightening the fasteners the seal is loaded, and thus, compressed to plastically deform and create an annular seal between the first and second members.

26 Claims, 8 Drawing Sheets

METALLIC SEAL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to a metallic seal for creating a seal between a pair of members. More specifically, the present invention relates to a seal that provides a highly reliable seal by concentrating the available load over a narrow band (small sealing area equaling high contact stress) to produce a high quality sealing dam over a sufficient width to minimize leakage on a molecular level.

2. Background Information

A typical static seal assembly has a first member with a first mating surface, an annular seal of suitable sealing material (e.g., metal O-ring), and a second member with a second mating surface. A mechanical load is applied to the seal through the first and second mating surfaces of the members. Typically, the mechanical load is created by torquing down a multitude of fasteners such that a displacement, also known as compression, occurs between the sealing surfaces. The net loading of the contact surfaces creates the two sealing lines.

The low leakage requirement can be achieved by compressing a solid metal ring of rectangular cross-section with a sufficient force. One problem with a solid metal ring is that the force created could be of sufficient magnitude to cause plastic deformation of the mating surfaces of the members. This plastic deformation of the mating surface is called brinelling. Once brinelled, the probability of proper re-sealing is drastically reduced without first repairing the damaged sealing surfaces.

The design requirements for static sealing therefore requires an optimum load level and flexibility. A good static seal when compressed must be able to generate load levels large enough to seal, but not large enough to brinell the cavity surface. Currently, there are many types of metallic seals in the prior art.

The metallic "O" rings were an early effort to meet these conflicting design requirements. However, the resiliency of this type of seal is rather limited because the "O" ring, whether solid or hollow, is usually too stiff, and is inherently expensive. The development of the C-shaped seal was an improvement to the "O" ring. In particular, by simply discarding a portion of the "O", the hoop restraint of the seal is greatly reduced and the seal becomes more flexible. However, the basic "C" seals typically cannot reach the desirable standard vacuum level of $1\times10e^{-9}$ cc/sec He leakage rate or better without modification and without being coated with very soft plating materials. Some previous C-shaped seals have been designed to provide this level of seal integrity.

In view of the above, it will be apparent to those skilled in the art that there exists a need for an improved seal with optimized sealing areas that minimizes brinelling and shifting of the sealing line. This invention addresses this need in the art as well as other needs, which will become apparent to those skilled in the art once given this disclosure.

SUMMARY OF THE INVENTION

One object of the present invention is to provide a highly reliable metallic seal that is relatively inexpensive to manufacture.

Another object of the present invention is to provide a metallic seal, which has geometrically simple cross sections, and can be manufactured with existing equipment in large quantities with tight tolerances.

Still another object of the present invention is to provide a highly reliable metallic seal which concentrates the available load over a narrow band which minimizes the required load to compress the seal by optimizing the sealing dam width.

Yet another object of the present invention is to provide a metallic seal in which the seal dam does not significantly shift during compression of the seal.

Another object of the present invention is to provide a metallic seal, which uses controlled column buckling to limit reaction forces and avoid deformation and brinelling.

Another object of the present invention is to provide a metallic beam column seal which has a leakage rate of less than $1\times10e^{-9}$ cc/sec He leakage rate or better, The invention results from the realization that a truly superior seal made wholly of metal in the nature of a "C" seal can be effected utilizing a construction that has two spaced structured beams interconnected by a structured column which provides an extensive seal and buckles in a controlled fashion to maintain the seal without shifting of the sealing line or brinelling the mating surfaces of the members to be sealed.

The foregoing objects can basically be attained by providing a metallic seal that concentrates the available load over a narrow band to produce a sealing dam over a sufficient width to minimize leakage while optimizing the load required to compress the seal. The metallic seal has a first annular beam section, a second annular beam section, and inner and outer surfaces extending between the first and second annular beam sections. One of the inner and outer surfaces has an annular recess that at least partially defines an annular column section of material extending substantially perpendicular between said first and second annular beam sections thereto. The first annular beam section has a first non-sealing surface and a first raised portion with a first annular sealing surface facing in a first axial direction to contact a first member for creating a first annular sealing dam therebetween. The second annular beam section has a second non-sealing surface and a first raised portion with a second annular sealing surface facing in a second axial direction, which is opposite to the first axial direction, to contact a second member for creating a second annular sealing dam therebetween. The annular inner surface extends between the first and second sealing surfaces to form a central passageway.

Other objects, salient features and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
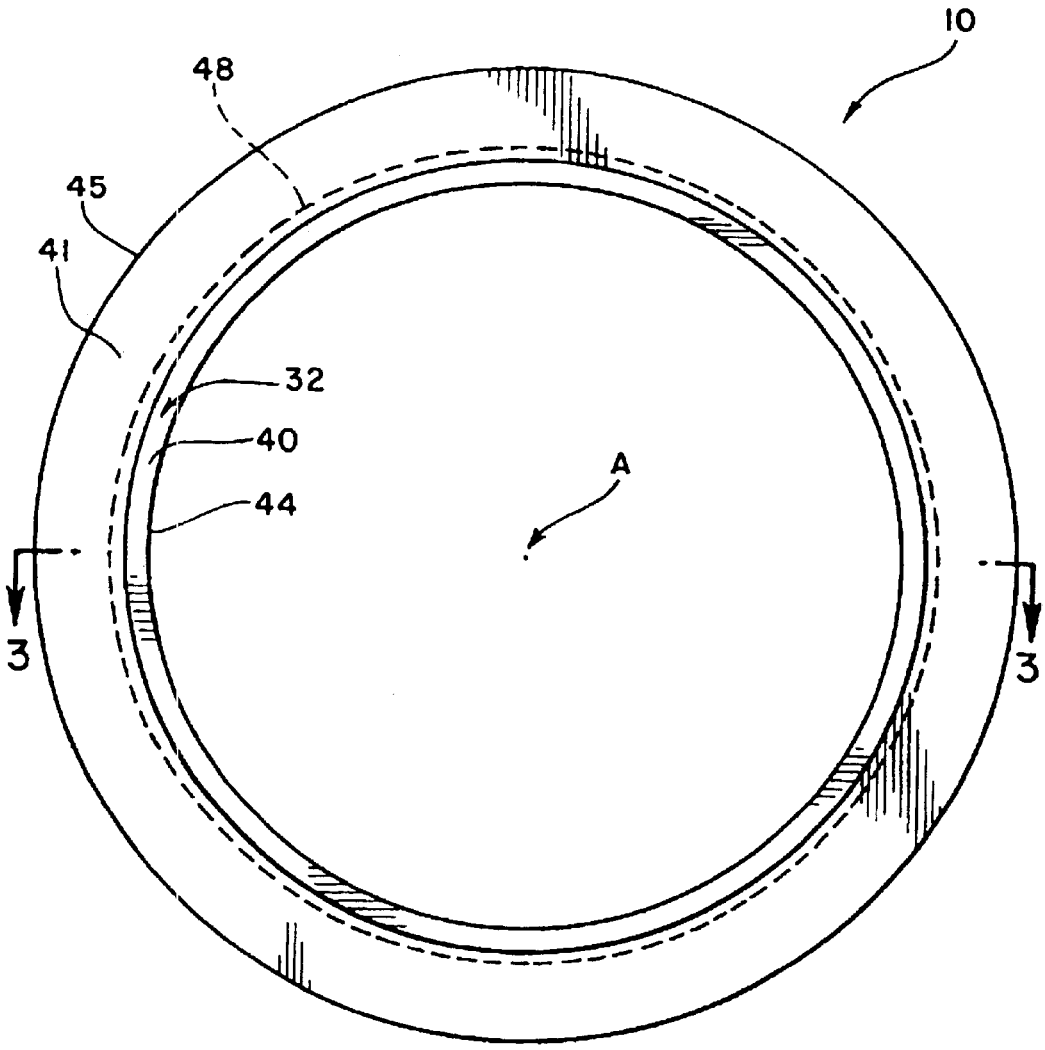
FIG. 1 is a top plan view of a metallic seal in accordance with a first embodiment of the present invention.
Figure 2:
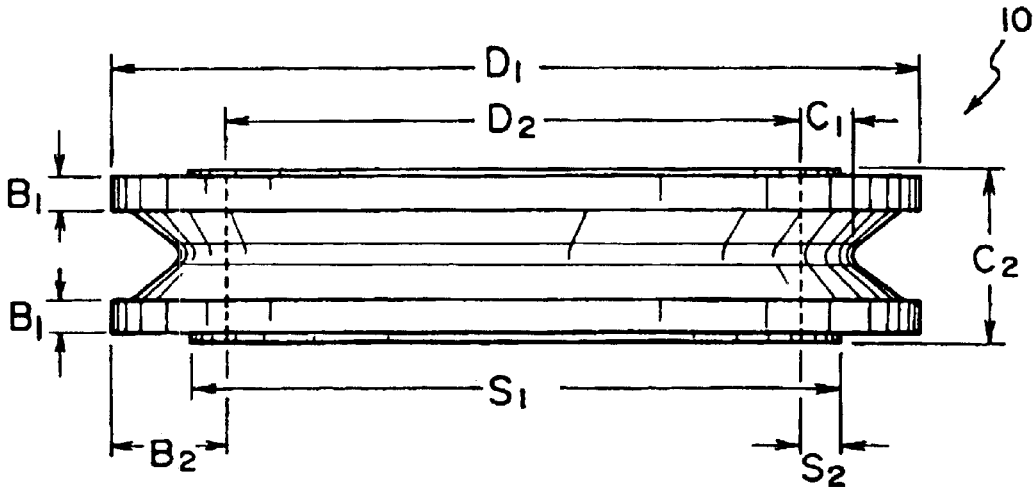
FIG. 2 is a side elevational view of the metallic seal illustrated in FIG. 1 in which an annular recess is formed in an annular outer surface of the seal to form two diagonal braces.

Initially referring to FIGS. 1 and 2, a metallic seal 10 in accordance with a first embodiment of the present invention is illustrated. Metallic seal 10 is illustrated as being circular. However, it will be apparent to those skilled in the art from this disclosure that seal 10 could have other types of non-circular ring shapes. Metallic seal 10 provides the following primary functions when applied to high reliability and pressure tight ($<1\times10e^{-9}$ cc/sec He leak rates): low total load to compress (low force per unit circumference or pounds per circumferential inch—SCI).

Metallic seal 10 is preferably machined to its desired shape from a suitable metallic material having the desired sealing properties. For example, seal 10 can be constructed of a ductile alloy or metallic element (tin, nickel, aluminum, or copper) to improve seal integrity. The typical material for seal 10 would be stainless steel, aluminum, nickel and copper. Softer coatings can be employed as well, such as, tin, aluminum or nickel with a thickness between 0.001" and 0.006", and with different specific yield strengths, i.e., requiring more or less load to create a condition whereby the coating plastically deforms over a given width. Other suitable metal elements can be employed as well.

Seal 10 is especially useful in the semiconductor, process equipment or vacuum process industries, and any other industry that requires the above stated functionality. In other words, seal 10 is applicable to the semiconductor process and vacuum equipment industries, or any other industry where high reliability, low load to compress and extremely tight sealing ($1\times10e^{-9}$ cc/sec He leakage rate or better) is required. Seal 10 is also applicable anywhere that the basic configuration lends itself to the sealing gland dimensions or the available bolt loading.

Possible variations of the illustrated seal 10 include a range of diameters, shapes, heights, coatings, base materials chosen for coefficient of thermal expansion matches, pressure or vacuum sealing, sealing any fluid by choosing compatible materials, or any other variation typically used to configure the seal 10 for a given application.

Figure 4:
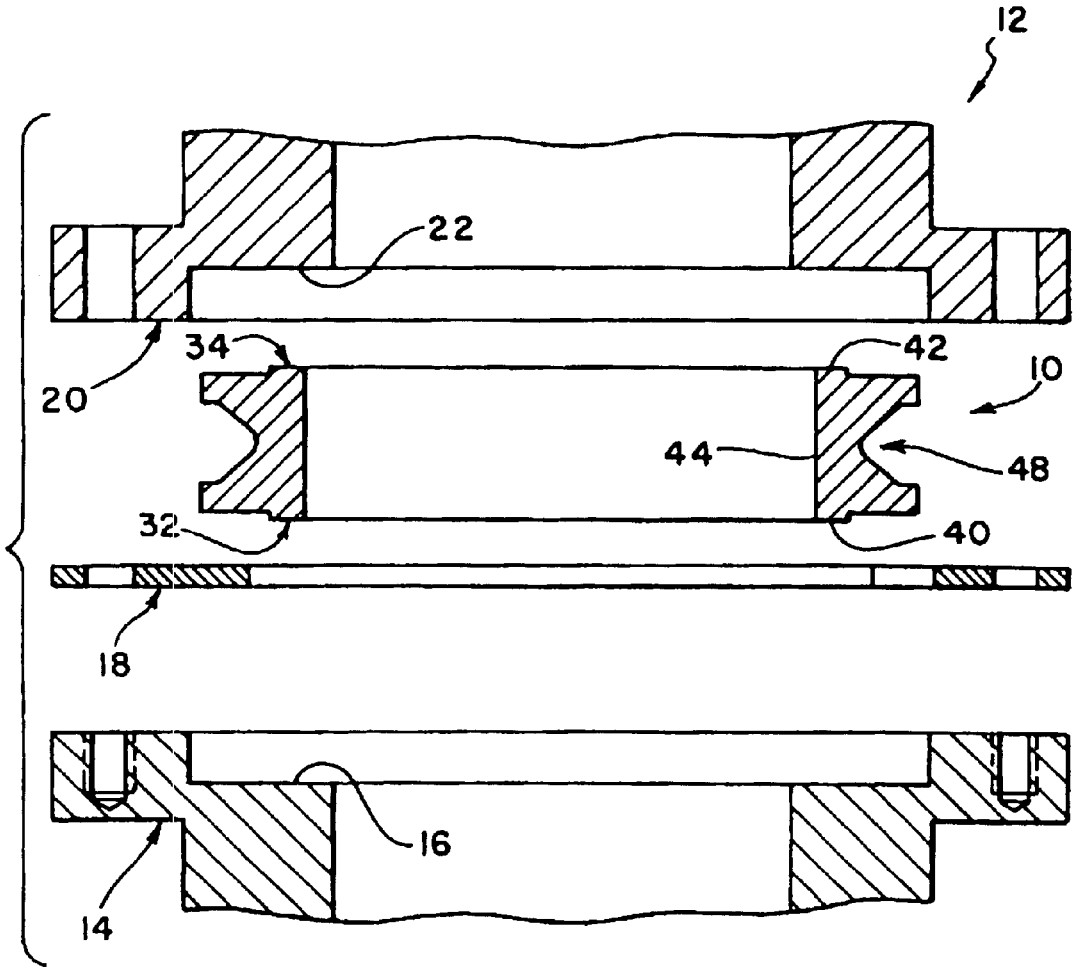
FIG. 4 is an exploded, longitudinal cross-sectional view of the metallic seal illustrated in FIGS. 1–3 together with a seal assembly having a pair of mating members or plates and a spacer member which are coupled together by fasteners to axially compress the metallic seal for creating an annular seal therebetween.
Figure 5:
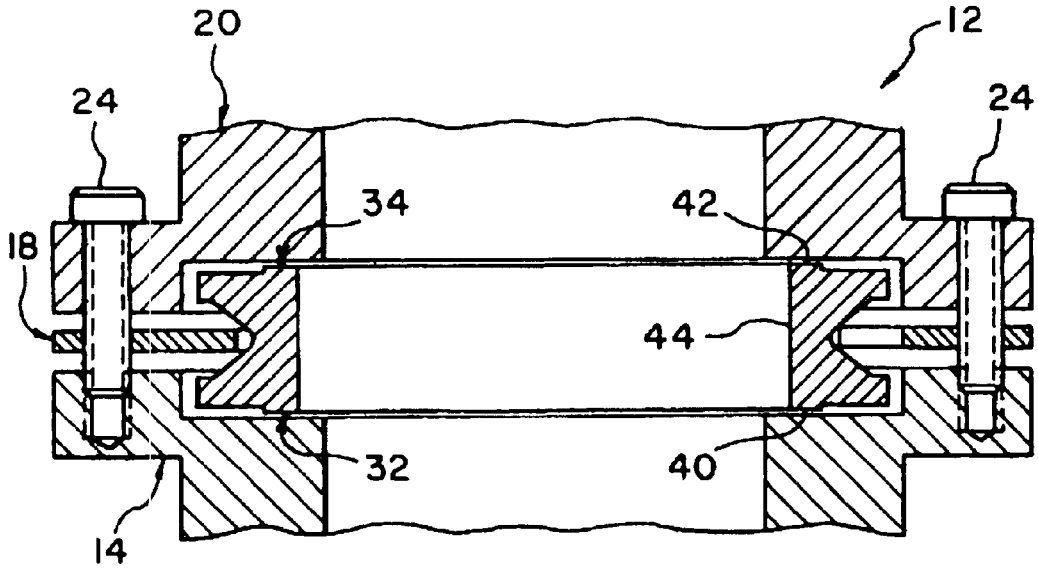
FIG. 5 is a longitudinal cross-sectional view of the mating members, the spacer member and the metallic seal prior to compression of the metallic seal, i.e., unloaded.
Figure 6:
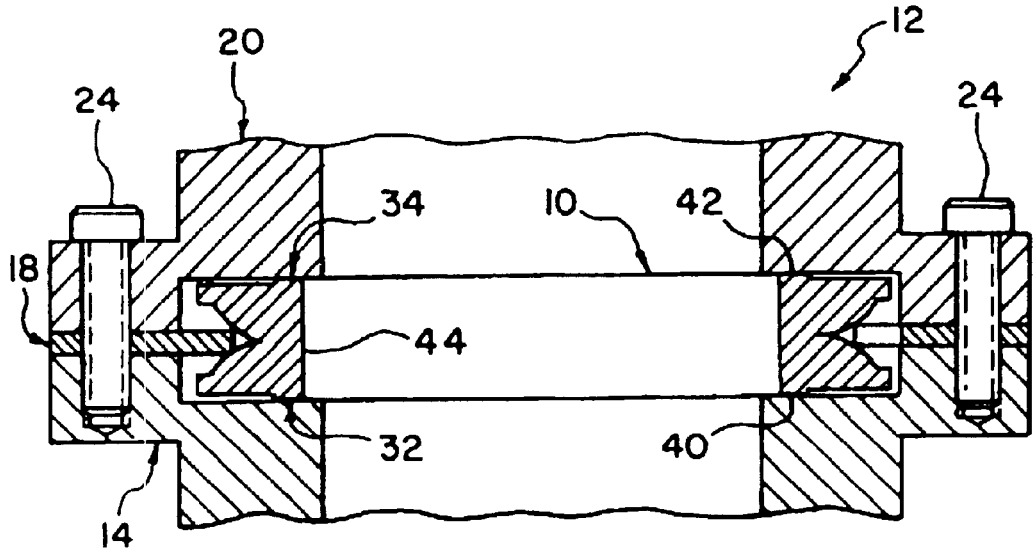
FIG. 6 is a longitudinal cross-sectional view, similar to FIG. 5, of the mating member, the spacer member and the metallic seal, but after the mating members have been coupled together by the fasteners to compress the metallic seal for creating an annular seal therebetween.
Figure 7:
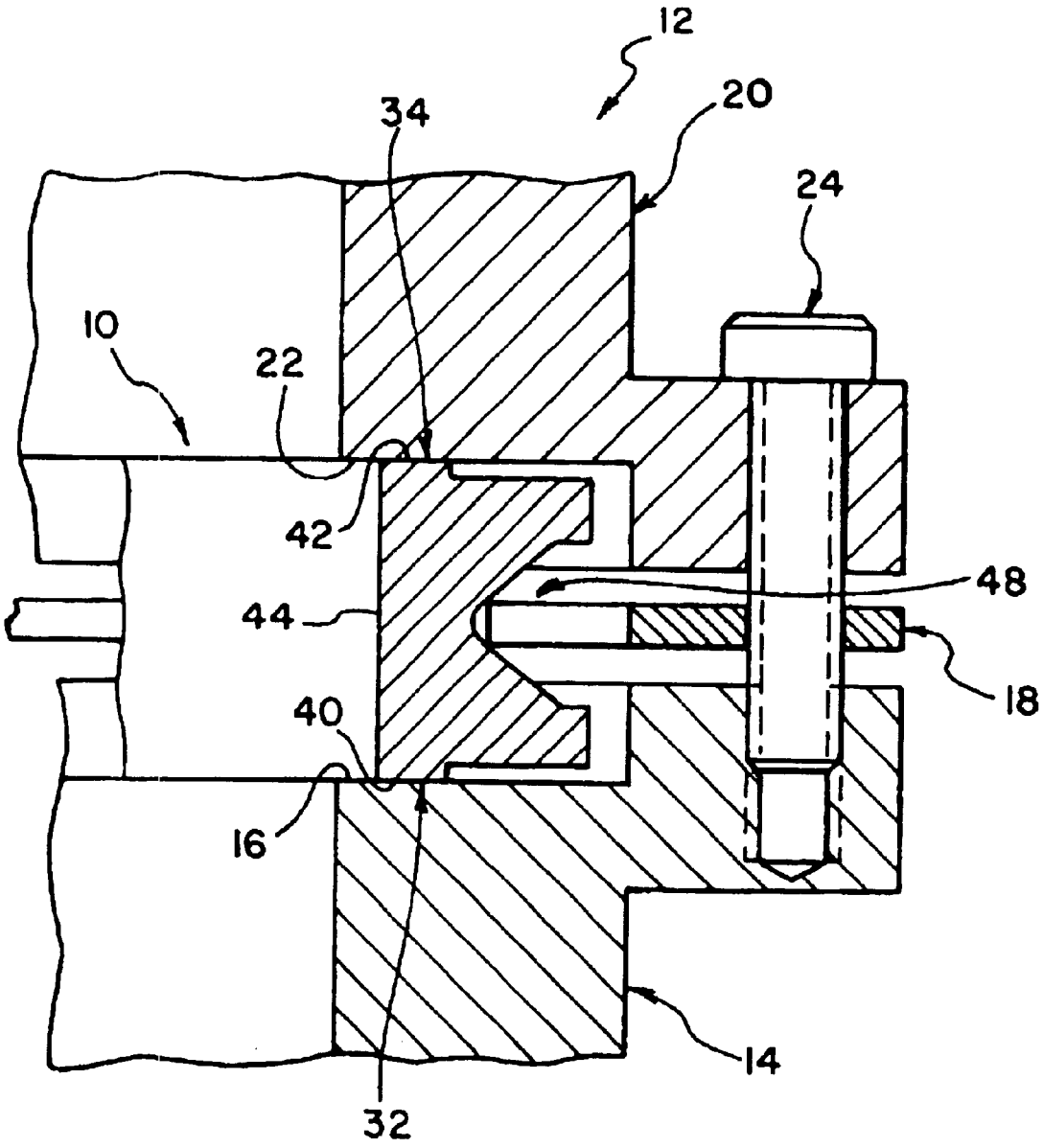
FIG. 7 is an enlarged, partial cross-sectional view of a portion of the metallic seal illustrated in FIGS. 1–6, prior to compression of the metallic seal, i.e., unloaded.

As seen in FIGS. 4–6, a sealing assembly 12 in accordance with a first embodiment of the present invention is illustrated in which metallic seal 10 forms a part thereof. More specifically, seal assembly 12 includes a first plate or member 14, with a first mating or sealing surface 16, a spacer member 18 and a second plate or member 20 having a second mating or sealing surface 22 for contacting seal 10. The members 14, 18 and 20 are coupled together by a plurality of fasteners or bolts 24. By tightening fasteners 24, seal 10 is loaded, and thus, compressed to plastically deform and create an annular seal between first and second members 14 and 20. Deformation of seal 10 is approximately 12% to 40% of the axial height of the seal between its sealing surfaces.

The purpose of metallic seal 10 is to provide a seal between two opposing members 14 and 20; which can be either metal to metal, metal to ceramic, ceramic to ceramic, or any appropriate combination of materials commonly used in process gas and/or chemical delivery and distribution systems, or additionally, between flanges or components for any fluid control or pneumatic application. Seal 10 will most typically be used in a groove, counterbore or between relatively flat surfaces with spacer or retainer member 18 providing a fixed separation of the components to be sealed. Seal 10 can be produced in circular or non-circular configurations and may also be produced in a variety of heights, diameters and cross-sections.

Figure 3:
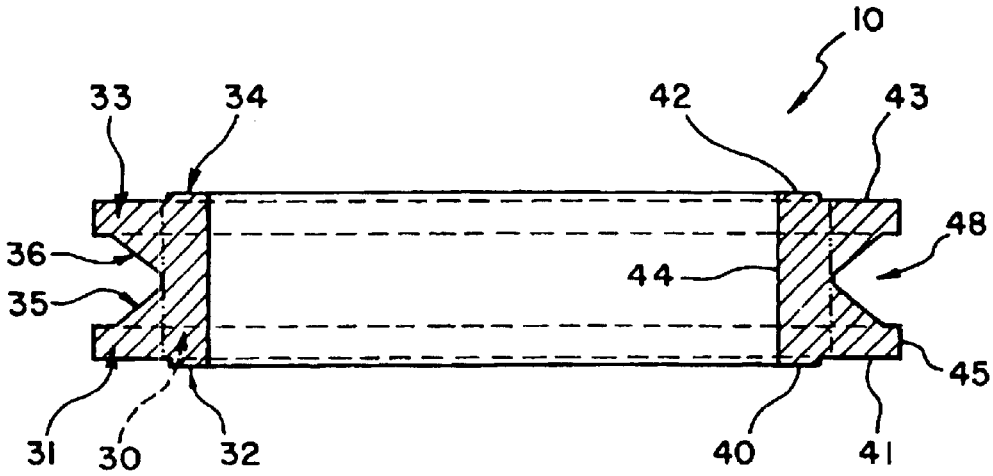
FIG. 3 is a cross-sectional view of the metallic seal illustrated in FIGS. 1 and 2, as seen along section line 3—3 of FIG. 1.

As best seen in FIG. 3, the cross-sectional profile of seal 10 can be basically broken down to seven sections (shown in broken lines). In particular, the cross-sectional profile of seal 10 has a slender column section 30, a first beam section 31 with a first raised portion 32, a second beam section 33 with a second raised portion 34, a first diagonal brace section 35 and a second diagonal brace section 36. The first beam section 31 of metallic seal 10 has an axial facing surface with a first annular sealing surface 40 formed on first raised portion 32 and a first annular non-sealing surface 41 located radially outward of first raised portion 32. The second beam section 33 has an axially facing surface with a second annular sealing surface 42 formed on second raised portion 34 and a second annular non-sealing surface 43 located radially outward of second raised portion 34. The metallic seal 10 is ringshaped with an annular inner surface 44 and an annular outer surface 45. In this embodiment, the outer surface 45 of seal 10 has annular recess 48 that allows for seal 10 to be axially compressed and provide a controlled buckling.

Figure 8:
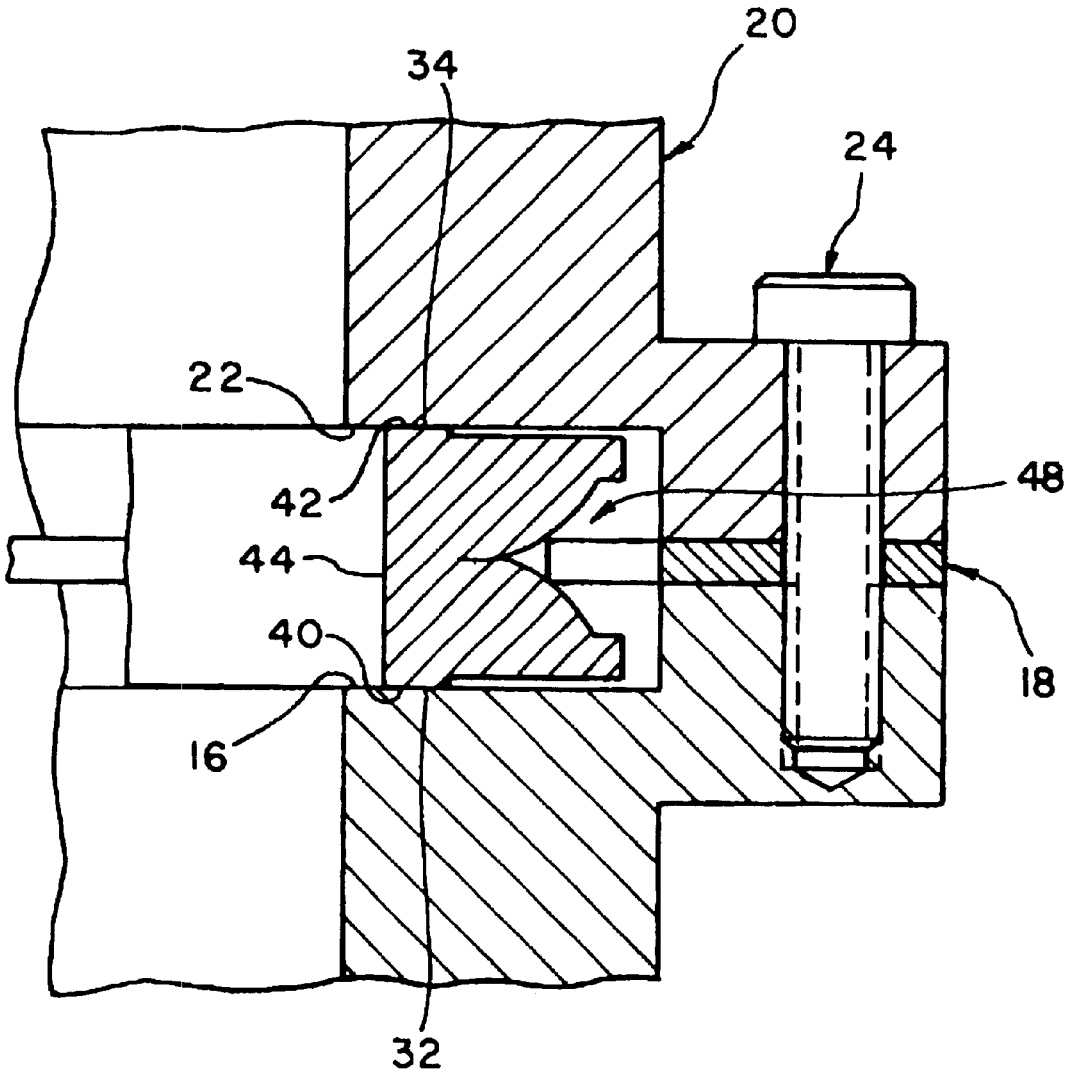
FIG. 8 is an enlarged, partial cross-sectional view of the mating members and the metallic seal illustrated in FIGS. 1–6, after compression of the metallic seal, i.e., loaded to compress the metallic seal for creating an annular seal therebetween.

First annular sealing surface 40 is located on first raised portion 32 and faces in a first axial direction to contact sealing surface 16 of first member 14 for creating a first annular sealing dam therebetween. Second annular sealing surface 42 is located on second raised portion 34 and faces in a second axial direction, which is opposite to the first axial direction of first annular sealing surface 40. The second annular sealing surface 42 contacts sealing surface 22 of second member 20 for creating a second annular sealing dam therebetween. Preferably, first and second annular sealing surfaces 40 and 42 are substantially flat surfaces, which are parallel to one another and perpendicular to the center axis A of seal 10. Optionally, annular sealing surfaces 40 and 42 can be coated with a deformable plating or the like. However, such a deformable plating is typically unnecessary in seals of the present invention. The raised portions 32 and 34 are deformed axially, as seen in FIGS. 6 and 8, such that a small space exists between the non-sealing surfaces 41 and 43 and the surfaces 16 and 22, respectively.

Figure 12:
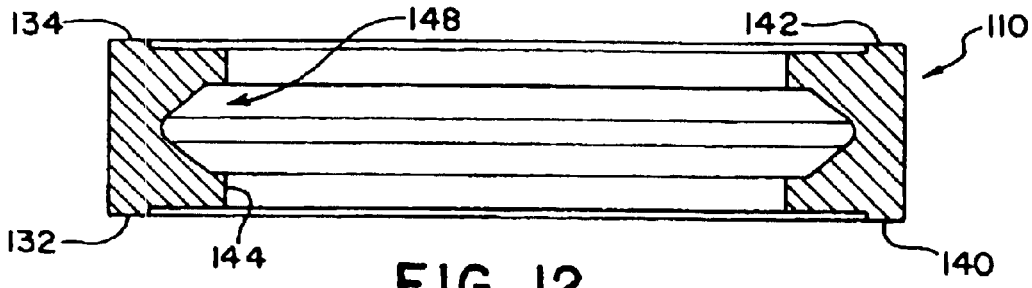
FIG. 12 is a longitudinal cross-sectional view of a metallic seal according to a second embodiment of the present invention in which an annular recess is formed in its inner surface.

In this embodiment, the first and second raised portions 32 and 34 are located adjacent the inner surface 44. Of course, the location of the raised portions 32 and 34 can be moved radially along the first and second beam sections 31 and 33, as needed and/or desired. Preferably, raised portions 32 and 34 are located such that annular sealing surfaces 40 and 42 at least partially overlie the column section 30 in an axial direction. In the illustrated example, seal 10 has its recess 48 on its outer surface 45, therefore, it is preferable that the raised portions 32 and 34 are not located too far radially outwardly from the inner surface 44. Preferably, the raised portions 32 and 34 are not located any farther than approximately the half of the radial length of the first and second beam sections 31 and 33 such that annular sealing surfaces 40 and 42 remain at least partially overlying the column section 30 in an axial direction. Of course, if the annular recess 48 is located on the inner surface 44, the first and second raised portions 32 and 34 should be located at or near the outer surface as seen in FIG. 12.

Annular inner surface 44 extends between first and second annular sealing surfaces 40 and 42 to form a central passageway which is surrounded by inner surface 44. In this particular embodiment, inner annular surface 44 extends substantially perpendicular to first and second sealing surfaces 40 and 42. However, it will be apparent to those skilled in the art from this disclosure that inner surface 44 can be further machined to decrease the amount of the loading force necessary to deform seal 10. Moreover, inner surface 44 can be contoured such as to have an annular recess or the like.

Annular outer surface 45 extends between first and second non-sealing surfaces 41 and 43, and is spaced radially outwardly from annular inner surface 44. Outer surface 45 has an annular recess 48 extending in a substantially radial direction to control the amount of loading force necessary to deform seal 10. Preferably, recess 48 is a continuous recess with a uniform shape. The slanted surfaces of recess 48 preferably form an angle of approximately 90°. Of course, this angle can range from about 70° to about 110°.

Figure 15:
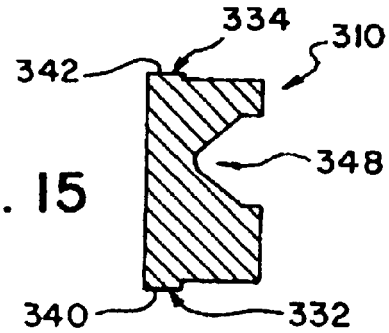
FIG. 15 is a partial cross-sectional view of a portion of a metallic seal with an alternate cross-section in accordance with the present invention.

The slender column section 30 extends between annular sealing surfaces 40 and 42, and overlaps portions of the beam sections 31 and 33 and includes raised portions 32 and 34. In particular, beam sections 31 and 33 extend between annular inner surface 44 and annular outer surface 45 of seal 10. The diagonal brace sections 35 and 36 are angled relative to column section 30 and beam sections 31 and 33 to define annular recess 48. In this particular embodiment, the diagonal brace sections 35 and 36 extend approximately from the midpoint of column section 30 towards the outer ends of beam sections 31 and 33 to provide support for beam sections 31 and 33 at their outer ends. This can be better seen by the line drawing in FIG. 9, which diagrammatically illustrates the sections of seal 10 as straight lines to represent the column, beams, raised portions and braces that form the cross-section profile of seal 10. The shape of recess 48 is determined by the desired seal widths and locations of sealing surfaces 40 and 42, the desired minimum column width $C_1$, the effective angles of brace sections 35 and 36 and the thickness or depth $B_1$ of beam sections 31 and 33. Alternatively, the recess 48 can be formed closer to either the top or bottom of seal 10, instead of being centered as seen in FIG. 15.

Referring again to FIG. 3, the shape of seal 10 is typically made by conventional machining techniques. For example, seal 10 can be produced on a lathe. In forming seal 10, a bore is formed in a stock of material to form inner surface 44. Then, one of the axial ends of the stock material is machined to form raised portion 32 and the non-sealing surfaces 41 of beam section 31. Now, an annular cut is made in the outer diameter or surface 45 of seal 10 to form annular recess 48. Then, the other axial end of the seals 10 is machined to form the raised portion 34 and the non-sealing surfaces 43 of beam section 33.

Figure 9:
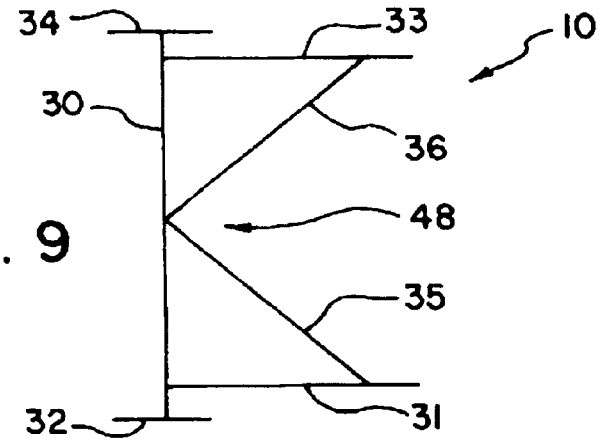
FIG. 9 is an equivalent diagrammatic view of the metallic seal illustrated in FIGS. 1–8, showing the column, beams and braces formed therein.

The geometric and dimensional characteristics of seal 10 can be particularly seen in FIGS. 2, 3 and 9. Referring initially to FIG. 2, the outer diameter $D_1$ of seal 10 can be any desired shape depending upon the application of seal 10, i.e., there is no limit to its outer diameter. The inner diameter $D_2$ of seal 10 should be at least approximately 0.008 inch or greater. The free axial height of seal 10 is equal to the height $C_2$ of annular column section 30 which is typically between approximately 0.020 inch to approximately 1.0 inch. The radial width of seal 10 is the difference between the outer diameter $D_1$ and the inner diameter $D_2$, i.e., the distance between outer surface 45 and inner surface 44. In this preferred embodiment, the radial width of the seal 10 is preferably at least approximately 0.020 inch or greater.

First and second annular sealing surfaces 40 and 42 preferably have an outer sealing diameter $S_1$, a radial sealing width $S_2$ and an axial height $C_2$. In one potential embodiment of the present invention, the outer sealing diameter $S_1$ is approximately 0.228 inch. The radial width $S_2$ of the first and second annular sealing surfaces 40 and 42 is approximately 0.015 inch. The axial height $C_2$ between the first and second annular sealing surfaces 40 and 42 is approximately 0.070 inch. Raised portions 32 and 34 extend axially approximately 0.003 inch from non-sealing surfaces 41 and 43. Accordingly, the first and second annular sealing surfaces 40 and 42 each extend axially outwardly from the first and second annular non-sealing surfaces 41 and 43 by approximately 0.003 inch, respectively. In this example, the seal 10 has an outer diameter $D_1$ that is approximately 0.282 inch, and an inner diameter $D_2$ of approximately 0.206 inch. The annular recess 48 is preferably formed on an outer surface 45 and has an axial height of approximately 0.036 inch. The wedge-shaped portion of the annular recess 48 forms an effective angle of approximately 70°–110°.

The effective minimum column width $C_1$ of column section 30 is typically between approximately 0.008 inch and approximately 0.042 inch. The height $C_2$ of annular column section 30, as mentioned above, is preferably in the range of approximately 0.020 inch to approximately 1.0 inch. The ratio between the height $C_2$ of annular column section 30 and the effective minimum width $C_1$ of annular column section 30 is preferably 3:1 or greater, i.e., the height $C_2$ is three times, or greater than the effective minimum width $C_1$ of column section 30. When the annular column height $C_2$ is less than 1.0 inch (smaller seals) the more optimum range of the effective column width $C_1$ of column section 30 is between 0.008 inch and approximately 0.030 inch. In other words, the taller the seal, the wider the effective minimum column width $C_1$ can be in comparison to smaller seals.

The axial thickness or depth $B_1$, of beam sections 31 and 33 depends upon brace sections 35 and 36. In particular, the axial depth $B_1$, of beam sections 31 and 33 can be effectively zero. In other words, non-annular sealing surfaces 41 and 43 can meet with recess 48 to form a point. However, if one of the brace sections 35 or 36 is eliminated, then the beam section 31 or 33 without the brace section 35 or 36 should have an axial depth $B_1$ of at least approximately 0.010 inch.

Beam sections 31 and 33 preferably have a radial width $B_2$ of at least approximately 0.045 inch or greater. Preferably, the radial widths $B_2$ of beam sections 31 and 33 are equal to one another and at least approximately three times the widths of the sealing surfaces 40 and 42. Of course, the widths $B_2$ of beam sections 31 and 33 can be different, if needed and/or desired.

Although thus far seal ring 10 has been depicted with annular recess 48 associated with outer surface 45, this is not a necessary limitation of the invention as annular recess 48 can be made in inner surface 44 such that recess 48 faces radially inwardly towards the center axis A of seal 10, as seen in FIG. 12.

Moreover, while seal 10 is shown with the beam sections 31 and 33, diagonal brace sections 35 and 36 and the column section 30 all integrally formed, this is not a necessary limitation of the invention as any one or more of them may be formed independently of the others as mentioned above.

In use, seal 10 is placed between member 14 and member 20 of seal assembly 12. The flat sealing dams of sealing surfaces 40 and 42 are in full sealing contact with the sealing surfaces 16 and 22 of members 14 and 20, respectively, when seal assembly 12 is coupled together as seen in FIGS. 4–8. In particular, members 14 and 20 are fastened together by a plurality of fasteners 24 (only two shown) which compresses seal 10 so that it bulges somewhat into annular recess 48 as seen in FIG. 8. Thus, seal 10 does not significantly shift the seal contact, and thus, maintains a better and more secure seal. The beam sections 31 and 33 and column section 30 collapse in a controlled fashion to limit the reaction forces. The sealing points do not significantly shift, but are maintained in constant seal contact.

Metallic seal 10, as shown in the attached drawings, provides a highly reliable seal by concentrating the available load over a narrow band (small surface area equaling high contact stress) to produce a high quality sealing dam over a sufficient width to minimize leakage on a molecular level. By minimizing the seal dam width over which the intimate contact between seal 10 and mating surfaces is needed, a high performance seal can be achieved without high compression loads. This method allows the substantially parallel sealing surfaces 40 and 42 of the seal 10 to be in intimate contact with the surfaces 16 and 22, resulting in a controlled contact stress.

Seal 10 is designed to accommodate seal cavity tolerances by designing the seal stiffness to be acceptable over the combined tolerance range of the cavity plus the seal. By designing the cross-section of seal 10 as shown in FIG. 3, the deflection of the section is controlled, i.e., there is no uncontrolled buckling. By varying the web thickness of the cross-section, the height, and the area of the annulus, the seal 10 can be designed to function in a variety of seal gland depths.

Prior Art Verses Metallic Seal 10

Figure 10:
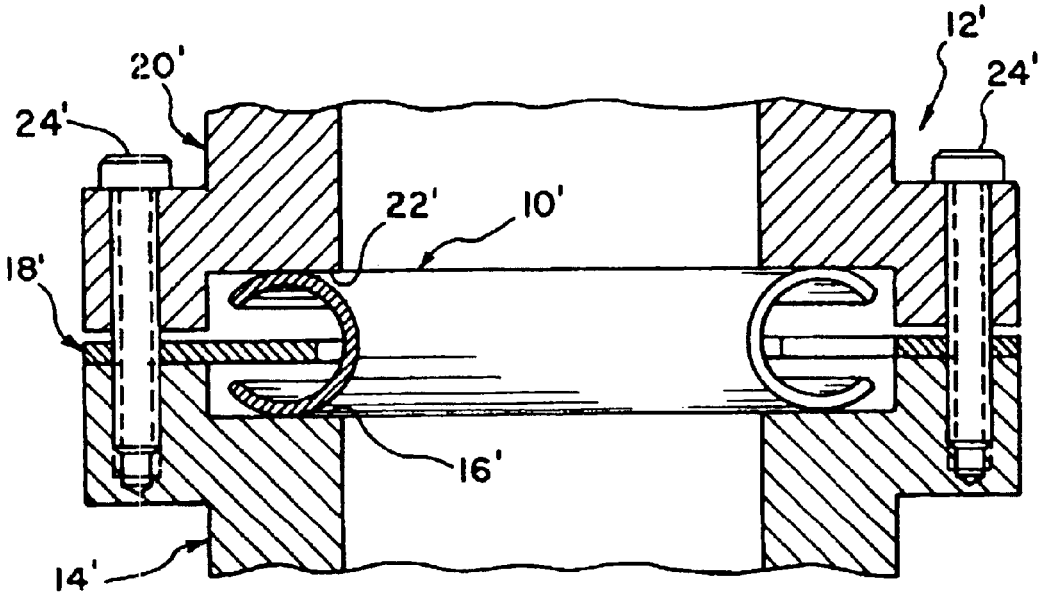
FIG. 10 (PRIOR ART)
FIG. 10 is a side longitudinal cross-sectional view of a prior art "C" ring seal in a sealing assembly.
Figure 11:
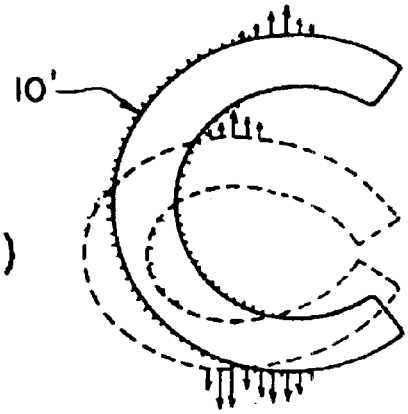
FIG. 11 (PRIOR ART)
FIG. 11 is a schematic side cross-sectional view of a prior art "C" seal in its unloaded position in full lines and its compressed or loaded position in broken lines.

As shown in FIGS. 10 and 11, a conventional seal assembly 12' is illustrated and includes a bottom or first member 14' with a bottom sealing surface 16' and a spacer member 18' which receives C-shaped seal 10' therein. A top or second member 20' with top sealing surfaces 22' with top sealing surface 22' is fastened to base plate or member 14' and clamped down by a plurality of fasteners 24' to bring sealing surface 22' to bear on the other side of "C" ring or seal 10'. Initially such a conventional "C" seal, shown in FIG. 11, unloaded and in an unconstrained environment, has a single point or line of contact at the top and the bottom where it meets with the sealing surfaces 16' and 22'. However, upon loading seal 10' as seen in FIG. 11, the seal 10' compresses and that seal dam line shifts and expands. This shifts the seal contact.

In contrast, seal 10 according to this invention, has two extended flat sealing surfaces 40 and 42 which are formed by two structural beam sections 31 and 33 supported by a slender structural column section 30 and reinforced by two diagonal brace sections 35 and 36. Slender column section 30 is typically taller or higher than it is wide. For example, column section 30 can be three times taller than it is wide. Brace sections 35 and 36 are typically at 35° to 55° angles with respect to beam sections 31 and 33. Accordingly, a wide sealing area is created on both sealing surfaces 40 and 42 which does not significantly shift during compression of seal 10.

Second Embodiment

Referring to FIG. 12, a metallic seal 110 in accordance with a second embodiment of the present invention is illustrated. Seal 110 is nearly identical to seal 10, discussed above, except that seal 110 has a recess 148 formed on its inner surface 144. In view of the similarities between seal 110 and seal 10, discussed above, seal 110 will not be discussed or illustrated in detail herein. Basically, metallic seal 110 has a first annular sealing surface 140 formed on first raised portion 132 and a second annular sealing surface 142 formed on second raised portion 134.

Although only a portion of metallic seal 110 is illustrated herein, it will be apparent to those skilled in the art from this disclosure that seal 110 is a continuous ring which can be either circular or non-circular. Preferably, the cross-section of seal 110 is uniform. Metallic seal 110 is preferably machined to its desired shape from a suitable metallic material having the desired sealing properties. For example, seal 110 can be constructed of pure metal, aluminum, or a high strength steel alloy such as stainless steel, or any other suitable sealing material.

Third Embodiment

Figure 13:
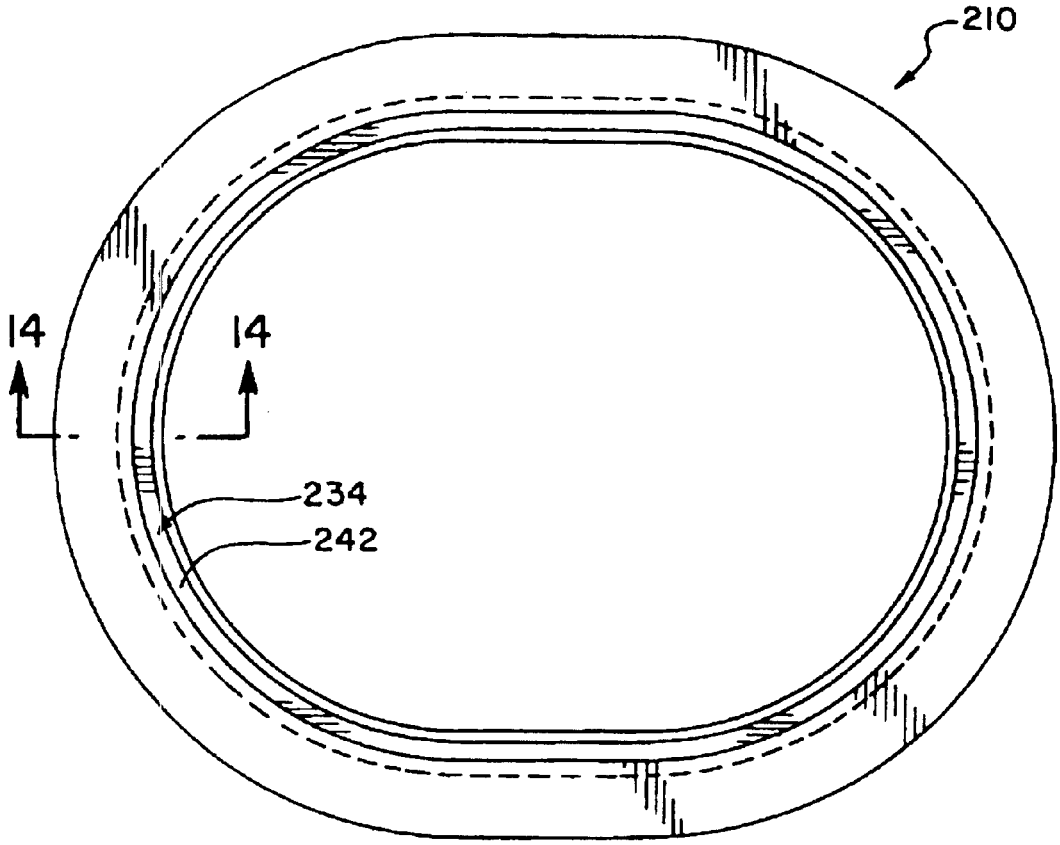
FIG. 13 is a top plan view of a metallic seal in accordance with a third embodiment of this invention.
Figure 14:
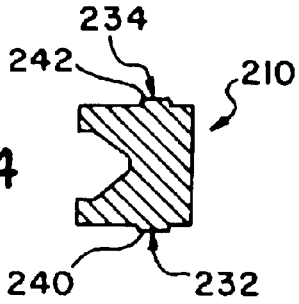
FIG. 14 is a partial cross-sectional view of a portion of the metallic seal illustrated in FIG. 13 as viewed along section line 14—14 in accordance with the third embodiment of the present invention.

Referring to FIGS. 13–14, a metallic seal 210 in accordance with a third embodiment of the present invention is illustrated. Seal 210 is nearly identical to seal 10, discussed above, except that seal 210 is illustrated with a non-circular shape and the raised portions 232 and 234 have been moved radially outward from the inner surface 244. In view of the similarities between seal 210 and seal 10, discussed above, seal 210 will not be discussed or illustrated in detail herein. Basically, metallic seal 210 has a first annular sealing surface 240 formed on first raised portion 232 and a second annular sealing surface 242 formed on second raised portion 234.

While metallic seal 210 is illustrated as being non-circular, it will be apparent to those skilled in the art from this disclosure that seal 210 is a continuous ring which can be either circular or non-circular. Preferably, the cross-section of seal 210 is uniform as it extends about the periphery of seal 210. Metallic seal 210 is preferably machined to its desired shape from a suitable metallic material having the desired sealing properties. For example, seal 210 can be constructed of pure nickel, aluminum, or a high strength steel alloy such as stainless steel, or any other suitable sealing material.

Fourth Embodiment

Referring to FIG. 15, a metallic seal 310 in accordance with a fourth embodiment of the present invention is illustrated. Seal 310 is nearly identical to seal 10 or 110, discussed above, except that seal 310 has its annular recess 348 located closer to one of the axial faces of the seal 310. In view of the similarities between seal 310 and seals 10 and 110, discussed above, seal 310 will not be discussed or illustrated in detail herein. Basically, metallic seal 310 has a first annular sealing surface 340 formed on first raised portion 332 and a second annular sealing surface 342 formed on a second raised portion 334.

The terms of degree such as "substantially", "about" and/or "approximately" as used herein mean a reasonable amount of deviation of the modified term such that the end result is not significantly changed. These terms should be construed as including a deviation of ±15% of the modified term if this would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A metallic seal comprising:

a first annular beam section having a first non-sealing surface and a first raised portion, said first raised portion having a first annular sealing surface facing in a first axial direction to contact a first member for creating a first annular sealing dam therebetween;

a second annular beam section having a second non-sealing surface and a second raised portion, said second raised portion having a second annular sealing surface facing in a second axial direction, which is opposite to said first axial direction, to contact a second member for creating a second annular sealing dam therebetween;

an annular inner surface extending between said first and second sealing surfaces to form a central passageway;

an annular outer surface extending between said first and second sealing surfaces and spaced from said annular inner surface to form an annular column section of material extending substantially perpendicular between said first and second annular beam sections thereto; and one of said annular inner and outer surfaces having *an* annular recess extending in a substantially radial direction to at least partly define an effective minimum width of said annular column section, at least a part of said first sealing surface of said first raised portion and at least a part of second sealing surface of said second raised portion being axially aligned with said annular column section, said first and second non-sealing surfaces being axially aligned with said annular recess and extending radially from said one of said annular inner and outer surfaces having said annular recess.

2. The metallic seal according to claim 1, wherein said annular recess is configured to form a first diagonal brace section extending from said annular column section to said first beam section.

3. The metallic seal according to claim 2, wherein said column section and said beam sections are integrally constructed from a one-piece, unitary member.

4. The metallic seal according to claim 2, wherein said effective minimum width of said column section lies within the range of approximately 0.008 inch to approximately 0.030 inch.

5. The metallic seal according to claim 2, wherein a second diagonal brace section extends from said annular column section to said second beam section.

6. The metallic seal according to claim 5, wherein said first and second brace sections meet approximately midway between said annular sealing surfaces at said annular column section.

7. The metallic seal according to claim 6, wherein each of said first and second brace sections extends from said column section at an angle of approximately 35° to approximately 55°.

8. The metallic seal according to claim 1, wherein said first and second sealing surfaces are located axially over only said annular column section.

9. The metallic seal according to claim 1, wherein said first and second sealing surfaces are located at one of said annular inner and outer surfaces.

10. The metallic seal according to claim 1, wherein said first and second sealing surfaces are substantially flat to form flat sealing lines upon compression.

11. The metallic seal according to claim 10, wherein said flat sealing surfaces are substantially parallel to each other.

12. The metallic seal according to claim 11, wherein said flat sealing surfaces are substantially perpendicular to a center axis of said metallic seal.

13. The metallic seal according to claim 1, wherein said column section has its axial height between said sealing surfaces at least as high as said effective minimum width.

14. The metallic seal according to claim 13, wherein said height of said column section is at least three times as long as minimum width of said column section.

15. The metallic seal according to claim 1, wherein said first brace section extends from said column section at an angle of approximately 35° to approximately 55°.

16. The metallic seal according to claim 1, wherein said annular column section has an axial height lying between approximately 0.020 inch to approximately 1.0 inch.

17. The metallic seal according to claim 1, wherein said annular recess is located approximately midway between said annular sealing surfaces.

18. The metallic seal according to claim 1, wherein said annular recess is located closer to one of said first and second annular sealing surfaces.

19. The metallic seal according to claim 1, wherein said annular recess is formed in said annular inner surface.

20. The metallic seal according to claim 1, wherein said annular recess is formed in said annular outer surface.

21. The metallic seal according to claim 1, wherein said seal is formed of a corrosion resistant alloy.

22. The metallic seal according to claim 1, wherein said seal is formed of a material selected from the group of pure nickel, copper, tin, aluminum and stainless steel.

*23. A metallic seal comprising:*

*a first annular beam section having a first non-sealing surface and a first raised portion, said first raised portion having a first annular sealing surface facing in a first axial direction to contact a first member for creating a first annular sealing dam therebetween;*

*a second annular beam section having a second non-sealing surface and a second raised portion, said second raised portion having a second annular sealing surface facing in a second axial direction, which is opposite to said first axial direction, to contact a second member for creating a second annular sealing dam therebetween;*

*an annular inner surface extending between said first and second sealing surfaces to form a central passageway;*

*an annular outer surface extending between said first and second sealing surfaces and spaced from said annular inner surface to form an annular column section of material extending substantially perpendicular between said first and second annular beam sections thereto; and*

*one of said annular inner and outer surfaces having an area of reduced strength extending in a substantially radial direction to at least partly define an effective minimum width of said annular column section,*

*at least a part of said first sealing surface of said first raised portion and at least a part of said second sealing surface of said second raised portion being axially aligned with said annular column section, said first and second non-sealing surfaces being axially aligned with said area of reduced strength and extending radially from said one of said annular inner and outer surfaces having said area of reduced strength.*

*24. The metallic seal according to claim 23, wherein said area of reduced strength is formed by a recess.*

*25. The metallic seal according to claim 24, wherein said recess is continuous around said one of said annular inner and outer surfaces.*

*26. The metallic seal according to claim 25, wherein said recess has a constant cross-sectional profile.*

* * * * *